United States Patent
Oyarzabal et al.

(10) Patent No.: US 9,760,552 B2
(45) Date of Patent: *Sep. 12, 2017

(54) DOCUMENT RENEWAL AND TRANSLATION

(71) Applicant: International Business Machines Corporation, Armonk, NY (US)

(72) Inventors: Randy E. Oyarzabal, Rochester, MN (US); Jeffery A. Turner, Lexington, KY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 770 days.

This patent is subject to a terminal disclaimer.

(21) Appl. No.: 13/787,205

(22) Filed: Mar. 6, 2013

(65) Prior Publication Data

US 2013/0185621 A1    Jul. 18, 2013

Related U.S. Application Data

(63) Continuation of application No. 12/952,785, filed on Nov. 23, 2010, now Pat. No. 8,972,848.

(51) Int. Cl.
*G06F 17/00* (2006.01)
*G06F 17/24* (2006.01)
(Continued)

(52) U.S. Cl.
CPC .............. *G06F 17/24* (2013.01); *G06F 17/21* (2013.01); *G06F 17/248* (2013.01);
(Continued)

(58) Field of Classification Search
CPC ........ G06F 17/289; G06F 17/21; G06F 17/24; G06F 17/2288; G06F 17/27; G06F 17/248; G06Q 10/10; G06Q 50/18
(Continued)

(56) References Cited

U.S. PATENT DOCUMENTS 5,903,905 A    5/1999    Andersen et al.
6,067,531 A    5/2000    Hoyt et al.
(Continued)

FOREIGN PATENT DOCUMENTS

GB    2451117 A    1/2009
GB    2458692 A    9/2009

OTHER PUBLICATIONS

Miles et al., "Electronic Business Contracts between Services", Oct. 8, 2008, King's College London, UK, University of Lyon, France, and Lost Wax, UK, pp. 14.*

(Continued)

*Primary Examiner* — Chau Nguyen
(74) *Attorney, Agent, or Firm* — Patterson + Sheridan, LLP

(57) ABSTRACT

Methods, systems and program products for renewing documents relating to an agreement between two entities. Content from an existing document is extracted, the existing document having been created from component documents. A selection of one or more updated component documents is received. An updated document is then generated based on the extracted content from the received document and the received selection of one or more updated component documents, wherein the updated document defines a revised agreement between the two entities.

7 Claims, 11 Drawing Sheets

(51) Int. Cl.
  *G06F 17/21* (2006.01)
  *G06F 17/28* (2006.01)
  *G06Q 10/10* (2012.01)
  *G06Q 50/18* (2012.01)
  *G06F 17/27* (2006.01)

(52) U.S. Cl.
  CPC ......... *G06F 17/289* (2013.01); *G06Q 10/103* (2013.01); *G06Q 50/18* (2013.01); *G06F 17/27* (2013.01)

(58) Field of Classification Search
  USPC .................................. 715/229; 707/694–695
  See application file for complete search history.

(56) References Cited

U.S. PATENT DOCUMENTS

| | | | |
|---|---|---|---|
| 6,457,030 B1 | 9/2002 | Adams et al. | |
| 6,873,992 B1 | 3/2005 | Thomas | |
| 7,069,234 B1 | 6/2006 | Cornelius et al. | |
| 7,278,094 B1 | 10/2007 | Dreyer et al. | |
| 7,313,540 B1 | 12/2007 | Hueler et al. | |
| 7,322,007 B2 | 1/2008 | Schowtka et al. | |
| 7,333,996 B2 | 2/2008 | Berry et al. | |
| 7,707,494 B2 | 4/2010 | Ohta | |
| 7,814,475 B2 | 10/2010 | Cohen et al. | |
| 7,818,219 B2 | 10/2010 | Klivington et al. | |
| 7,930,632 B2 | 4/2011 | Takashima et al. | |
| 7,996,759 B2 | 8/2011 | Elkady | |
| 8,196,030 B1 | 6/2012 | Wang et al. | |
| 8,365,080 B2 | 1/2013 | Karlson | |
| 2001/0034739 A1 | 10/2001 | Anecki et al. | |
| 2001/0051961 A1 | 12/2001 | Duxbury | |
| 2002/0059253 A1 | 5/2002 | Albazz et al. | |
| 2002/0083090 A1* | 6/2002 | Jeffrey | G06F 17/30011 715/202 |
| 2002/0129056 A1 | 9/2002 | Conant et al. | |
| 2002/0143583 A1* | 10/2002 | Reader et al. | 707/503 |
| 2002/0178120 A1* | 11/2002 | Reid | G06Q 10/10 705/59 |
| 2004/0083119 A1 | 4/2004 | Schunder et al. | |
| 2004/0085355 A1* | 5/2004 | Harmes | G06Q 10/10 715/751 |
| 2004/0088650 A1 | 5/2004 | Killen et al. | |
| 2004/0098704 A1 | 5/2004 | Becker et al. | |
| 2005/0091143 A1* | 4/2005 | Schmidt et al. | 705/37 |
| 2005/0094207 A1 | 5/2005 | Lo et al. | |
| 2005/0147442 A1 | 7/2005 | Walker et al. | |
| 2005/0207776 A1 | 9/2005 | Nomura et al. | |
| 2006/0009999 A1* | 1/2006 | Gee | G06Q 10/06 705/26.25 |
| 2006/0020592 A1 | 1/2006 | Gee et al. | |
| 2006/0200763 A1 | 9/2006 | Michaelsen et al. | |
| 2006/0242419 A1* | 10/2006 | Gaffey | G06Q 10/06 713/176 |
| 2007/0028175 A1 | 2/2007 | Moore et al. | |
| 2007/0038929 A1 | 2/2007 | Miyazawa | |
| 2007/0124661 A1 | 5/2007 | Hackworth et al. | |
| 2007/0156463 A1 | 7/2007 | Burton et al. | |
| 2007/0157079 A1 | 7/2007 | Baker | |
| 2007/0265969 A1 | 11/2007 | Horwat et al. | |
| 2007/0282627 A1 | 12/2007 | Greenstein et al. | |
| 2007/0299878 A1 | 12/2007 | Berry et al. | |
| 2007/0300146 A1 | 12/2007 | Yamanakajima | |
| 2008/0126401 A1 | 5/2008 | Walker et al. | |
| 2009/0024917 A1 | 1/2009 | Giannetti | |
| 2009/0070666 A1 | 3/2009 | Eilers et al. | |
| 2009/0190858 A1 | 7/2009 | Moody et al. | |
| 2009/0300471 A1 | 12/2009 | Dettinger et al. | |
| 2010/0070930 A1* | 3/2010 | Thibault | G06Q 10/10 715/854 |
| 2010/0088155 A1 | 4/2010 | Pyle et al. | |
| 2010/0313119 A1 | 12/2010 | Baldwin et al. | |
| 2012/0042239 A1 | 2/2012 | O'Brien | |
| 2012/0131426 A1 | 5/2012 | Oyarzabal et al. | |
| 2012/0131445 A1 | 5/2012 | Oyarzabal et al. | |
| 2013/0097485 A1 | 4/2013 | Oyarzabal et al. | |
| 2013/0111325 A1 | 5/2013 | Yue et al. | |
| 2015/0213568 A1 | 7/2015 | Follis et al. | |

OTHER PUBLICATIONS

"Using the Administrator Workbench to Manage Contracts Under Negotiation", Oracle Service Contracts User Guide, Feb. 1, 2007, Oracle, Release 12.1, Part No. E13458-04, pp. 10.*
U.S. Appl. No. 12/952,785, entitled Document Renewal and Translation, filed Nov. 23, 2010.

* cited by examiner

DOCUMENT RENEWAL AND TRANSLATION

CROSS-REFERENCE TO RELATED APPLICATIONS

This application is a continuation of co-pending U.S. patent application Ser. No. 12/952,785, filed Nov. 23, 2010. The aforementioned related patent application is herein incorporated by reference in its entirety.

BACKGROUND

Embodiments of the invention generally relate to document generation, and more specifically, to techniques for creating content using templates.

The creation of a service agreement is typically a complex project involving multiple stakeholders, each with different goals and concerns. Once the stakeholders reach a common agreement regarding various solution components of the project, such an agreement may be memorialized in a document of understanding. However, because each of the stakeholders may wish to modify the document of understanding with proposed amendments before the document is finalized, multiple inconsistent variations of the document may be created. Furthermore, reconciling these different variations of the document is often a time consuming and error prone process. Additionally, many service agreements are for a fixed period of time (e.g., one year), and once a service agreement expires, a new or updated document of understanding may be created to renew the service agreement. Without such updates, the document of understanding may quickly become obsolete and contain various inaccuracies and outdated information. However, such updates are currently a manual process that require a significant amount of time and resources, and are often an error-prone process as well.

SUMMARY

Embodiments of the invention provide a method, product and system for renewing a document. The creation of a service agreement is typically a complex project involving multiple stakeholders. The method, product and system include receiving an existing document to be renewed, wherein the existing document defines an existing agreement between two entities, and wherein the existing document was created based on a plurality of existing component documents. Additionally, the method, product and system include extracting content from the existing document. The method, product and system further include receiving a selection of one or more updated component documents. Furthermore, the method, product and system include generating an updated document, by operation of one or more computer processors, based at least in part on the extracted content from the existing document and the received selection of one or more updated component documents, wherein the updated document defines a revised agreement between the two entities, and wherein the revised agreement will go into effect when the updated document is approved.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
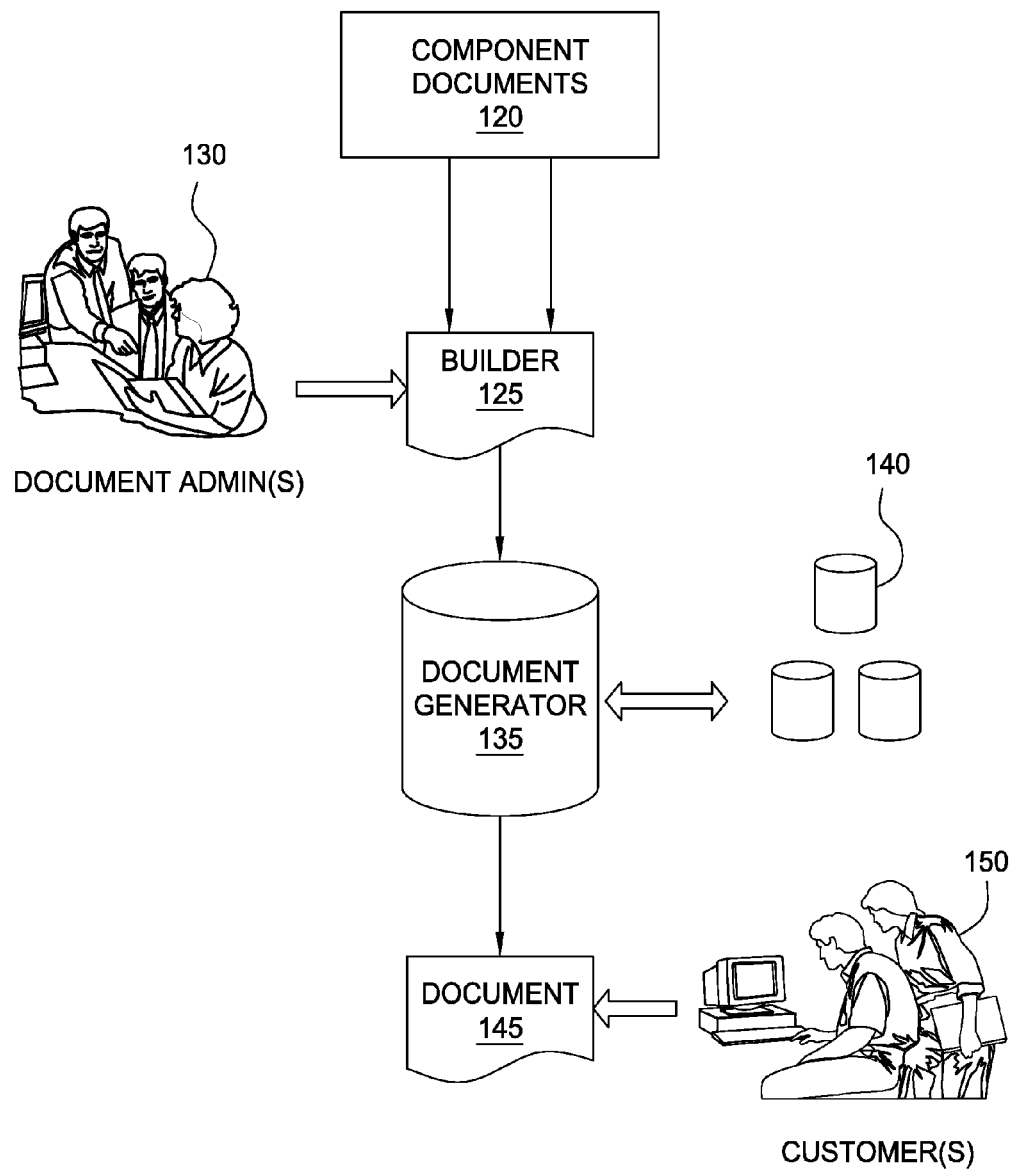
FIG. 1 is a diagram illustrating the creation of a document, according to one embodiment of the present invention.

Embodiments of the invention provide techniques for renewing documents created using a document creation component. Embodiments may receive an existing document of understanding to be renewed, and extract information from the existing document of understanding. Embodiments may then retrieve updated component documents to be used for renewing the existing document. Upon retrieving the updated component documents, embodiments may generate an updated document of understanding, based on the extracted information and the updated component documents. The updated document of understanding may generally define an agreement between two entities, and such an agreement will go into effect when the document is approved. The updated document my then be submitted for approval; and upon approval, the document may be marked as active to indicate the agreement is in effect.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a document creation component) or related data available in the cloud. For example, the document creation component could execute on a computing system in the cloud and allow users to renew existing documents of understanding using updated component documents. In such a case, a document creation component could receive an existing document, generate a new document based on the existing document and updated component documents, and store the new document at a storage location in the cloud. Doing so allows users to access the generated new content from any computing system attached to a network connected to the cloud (e.g., the Internet)

Referring now to FIG. 1, FIG. 1 is a flow diagram illustrating a document creation method, according to one embodiment of the present invention. For purposes of this example, assume that the generated document is a document of understanding related to an exemplary service agreement. As shown, the method 100 begins with the document administrators 130 interacting with the builder 125 to construct an initial document. Generally, the builder 125 may receive selections of components 120 from a user (e.g., the document administrators 130), and may populate each of these selections with data. In one embodiment of the invention, the builder 125 may display a list of available component documents 120 to the user and allow the user to select which component(s) to incorporate in the initial document. Generally, the components 120 define one or more attributes of the document of understanding. For example, the components 120 may include a billing component, which contains billing information related to a particular service offering. If the user selects the billing component, the builder 125 may further prompt the user for the information used to populate the billing component (e.g., an initial cost of the service agreement, a monthly cost of the service agreement, etc.).

Once the selected component 120 is populated, the builder 125 may insert the populated component into the initial document. The document administrators 130 may continue to interact with the builder 125 to add components 120 to the initial document until the initial document is complete. The document administrators 130 may additionally use the builder 125 to arrange the components in the initial document. For example, an initial document may contain two components: a billing component, and a billing component header. In such an example, a document administrator 130 may wish to arrange the components such that the billing component header precedes the billing component itself.

As discussed above, the builder 125 may populate certain information in the initial document based on user input. Additionally, the document generator 135 may also interact with one or more other applications 140 (e.g., a database) in order to populate portions of the final document. For example, the document generator 135 may retrieve updated pricing information from a pricing database 140, and may use the updated pricing information to populate fields in the billing component. In one embodiment of the present invention, the document administrators 130 may use the builder 125 to specify a particular source 140 to retrieve information from. For example, the document administrators 130 may specify that the billing component in the initial document should be populated using a particular database table related to pricing information.

Once all the components 120 have been added to the initial document and once any empty fields in the initial document are populated, the initial document is sent to the document generator 135 to create a final document. As referred to herein, the final document generally refers to the document of understanding generated according to embodiments of the invention. That is, although a first draft of the document of understanding has been created, such a draft may not be marked as active (i.e., will not take effect) until all the parties to the document have agreed to its terms. Although the current example involves only two parties (i.e., the business and the customer), more generally a document of understanding may govern the relationship between two or more parties. The final document 145 may then be sent to the customers 150 for approval. In one embodiment, rather than sending a separate instance of the document of understanding to the customers 150 for approval, embodiments may send a reference to a single, centralized copy of the document.

Upon receiving the final document 145 (or a reference to the final document), if the customers 150 wish to modify the final document 145, the customers 150 may reject the final document 145 and return the document to the document administrators 130 for revisions. The document administrators 130 may use the builder 125 to revise the components in the initial document, based on the revisions specified by the customer 150. A revised document may then be generated using the document generator 135, and the revised document may be submitted to the customers 150 for approval. Upon approval of the final document 145 (or the revised document), the final document 145 is marked as active and takes effect as the document of understanding for the exemplary service agreement.

Advantageously, by doing this, embodiments of the invention may more efficiently create a document of understanding for a particular project by using existing components 120 and data. For example, an existing solution for adding a billing section to a new document of understanding is to manually create the billing section in the document, research updated pricing data, and manually populate the billing section with the updated pricing data. In contrast, embodiments may more efficiently create the document by adding a billing component from the plurality of components 120 to the initial document, and then automatically populating the billing component with pricing data retrieved from a database 140. By doing this, embodiments of the invention may more efficiently create the document of understanding. Additionally, because embodiments create a single, centralized document of understanding, any revisions made to the document will be incorporated into the centralized copy of the document, thus preventing the creation of multiple inconsistent versions of the document.

Figure 2:
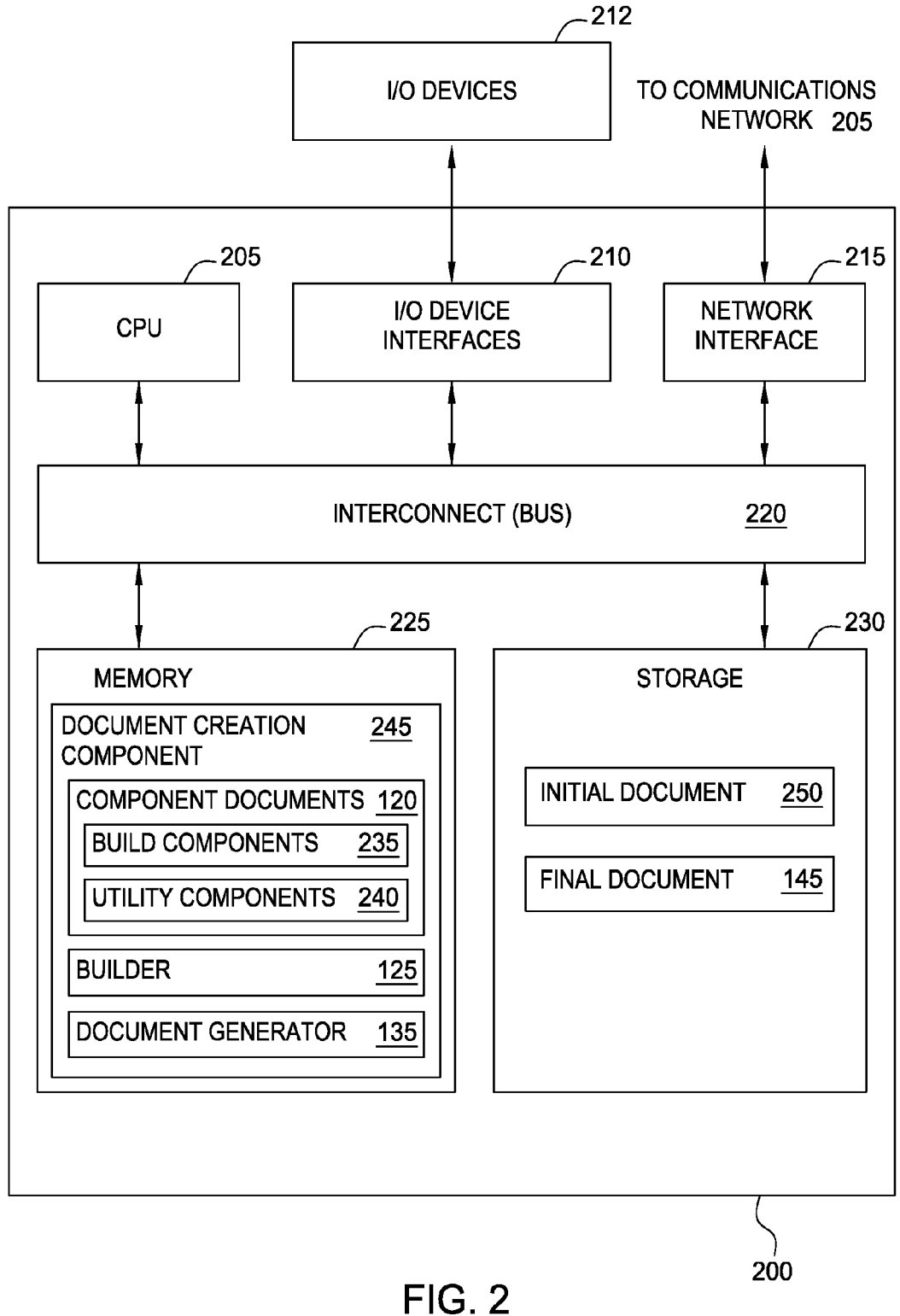
FIG. 2 is a block diagram of components of a computer system configured to run a document creation component, according to one embodiment of the present invention.

FIG. 2 is a block diagram of components of a computer system configured to run a document creation component, according to one embodiment of the present invention. As shown, the document creation system 200 includes, without limitation, a central processing unit (CPU) 205, a network interface 215, an interconnect 220, a memory 225, and storage 230. The document creation system 200 may also include an I/O devices interface 210 used to connect I/O devices 212 to the compute node 130. I/O devices 212 may represent a variety of input and output devices, including keyboards, mice, visual displays, printers and so on. The document creation system 200 may connect to the network 215 (e.g., the Internet) using the network interface 215.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. Furthermore, CPU 205 may be any processor capable of performing the functions described herein. Although memory 225 is shown as a single entity, memory 225 may include one or more memory devices having blocks of memory associated with physical addresses, such as random access memory (RAM), read only memory (ROM), flash memory or other types of volatile and/or non-volatile memory. Storage 230, such as a hard disk drive, solid state device (SSD), or flash memory storage drive, may store non-volatile data. Furthermore, as will be understood by one of ordinary skill in the art, any computer system capable of performing the functions described herein may be used.

In the pictured embodiment, memory 225 contains a document creation component 245, which in turn contains component documents 120, a builder 125, and a document generator 135. The component documents 120 contain build components 235 and utility components 240. The build components 235 are generally components pertaining to aspects of a service agreement, such as, without limitation, billing, hardware, and services. The utility components 240, on the other hand, are components pertaining to presentation and content of a created document, such as templates and service offerings. Additionally, storage 230 contains an initial document 250 and a final document 145. Furthermore, although various elements are shown as residing in either memory 225 or storage 230, such a depiction is without limitation and is merely for illustrative purposes.

Generally, users (e.g., document administrators) may use the document creation component 245 to create an initial document 250. More specifically, the builder 125 may present the user with a plurality of component documents 120, which may include both build components 235 and utility components 240, and allow users to select particular component documents for inclusion in the initial document 250. Upon receiving a selection of a particular component document 120, the builder 125 may add the selected component document 120 to the initial document 250. Additionally, the builder 125 may prompt the user regarding a placement in the initial document 250 to insert a selected component document 120. For example, if the user has already inserted a header for a billing section into the initial document 250, the user may then specify that a billing section itself should be inserted immediately following the header.

Additionally, the document creation component 245 may prompt the user for data with which to populate the selected component documents 120. For instance, an exemplary build component 235 may be a services component, which contains a list of services to be provided as part of a service agreement. In such an example, the document creation component 245 may prompt the user for which particular services should be included in the initial document 250. For example, a particular service agreement may include basic support services for an initial period of time, and may then include premium support services thereafter. In such a situation, the user may add two different service components to the initial document 250: one service component for the basic support service and a second service component for the premium support service. Additionally, the document creation component 245 may prompt the user for metadata about the provided services. For example, the metadata may include, without limitation, information about the service components such as when each service begins, a duration of each service, etc.

Once the user finishes adding component documents 120 to the initial document 250, the document generator 135 may generate a final document of understanding 145, based on the initial document 250. The document generator 135 may generate the final document 145 using a utility component 240 (e.g., such as a template). For example, the final document 145 may contain a billing section that includes a table detailing pricing information related to the service agreement. In such an example, the document generator 135 may generate the table with particular formatting specified by a particular utility component 240, such as a table template.

Additionally, the document generator 135 may query other applications (e.g., a database accessible over the communications network 205) and retrieve data for use in populating portions of the final document 145. For example, an exemplary initial document 250 may contain a billing section for a particular service agreement. In such an example, the document generator 135 may retrieve updated pricing information pertaining to the service agreement from an external database, and may populate a corresponding section of the final document 145 based on the retrieved pricing information. By doing this, embodiments of the invention may save the user from having to expend time and effort in manually retrieving the updated pricing information when creating a document of understanding. Furthermore, by retrieving updated information at the time the final document 145 is created, embodiments help to ensure the accuracy of information in the created document of understanding.

Figure 3:
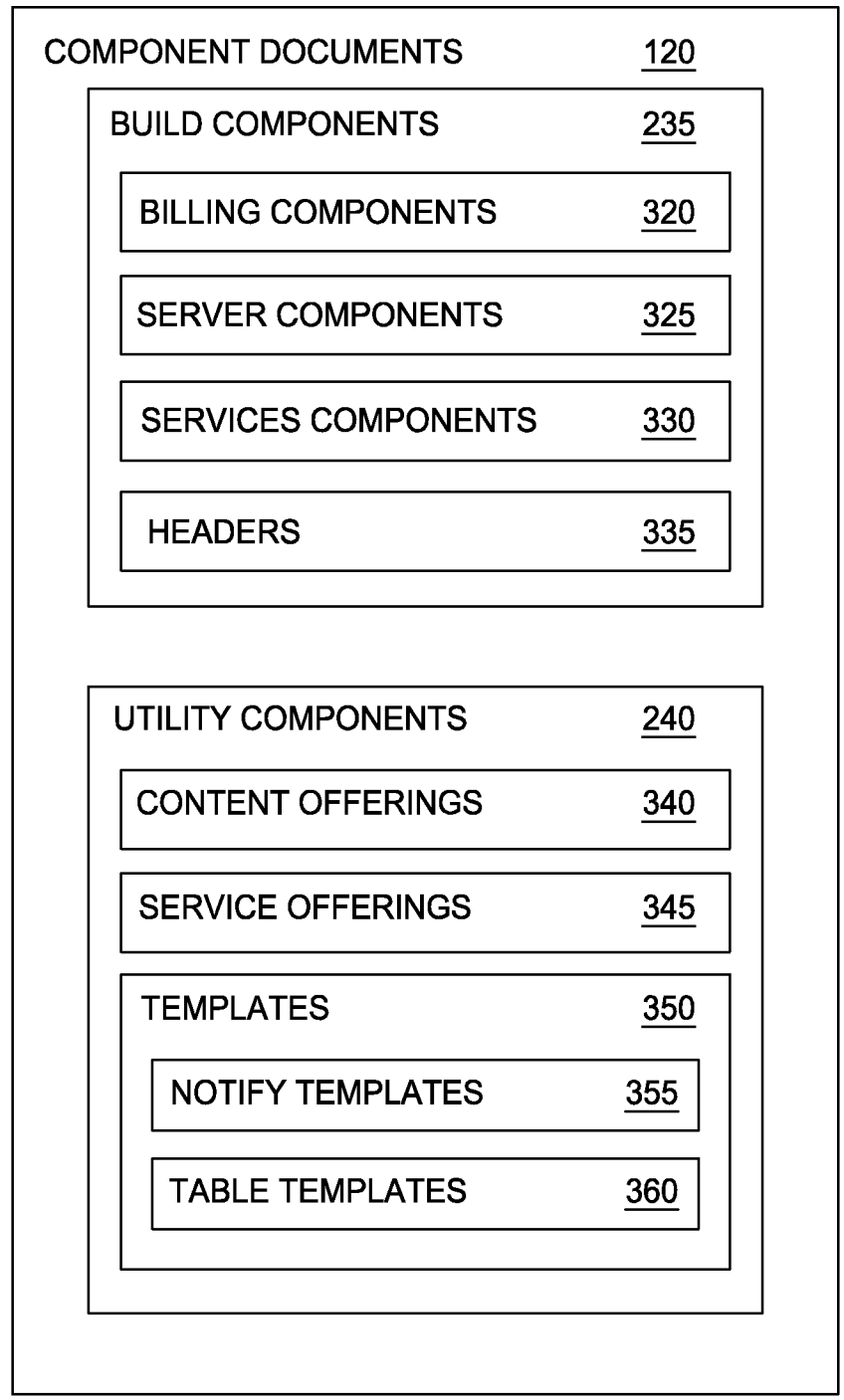
FIG. 3 is a block diagram of an exemplary embodiment of the components of FIG. 1, according to one embodiment of the present invention.

FIG. 3 is a block diagram of an exemplary embodiment of the components of FIG. 1, according to one embodiment of the present invention. As shown, the components 120 contain build components 235 and utility components 240. The build components 235 contain billing components 320, server components 325, services components 330, and headers 335. The billing components 320 generally relate to any billing structure involved in a service agreement including, but not limited to, fixed costs, recurring costs (e.g., monthly costs), and per-use costs. The server components 325 may relate to any server hardware provided as part of the service agreement. Such server hardware may include, without limitation, standalone computer systems, clustered computer systems, virtual computer systems, and cloud computer systems. The services components 330 generally relate to any services to be provided as part of the service agreement. For example, a service component 330 may specify a type of customer support (e.g., basic support, premium support, etc.) provided as part of the service agreement. As a second example, an exemplary service component 330 may specify computing services, such as web hosting, database access, shell access, etc., to be provided as part of the service agreement. The headers 335 generally include section headers for use in the created document of understanding.

As discussed above, the utility components 240 generally contain components used in creating the document of understanding. The utility components 240 contain content offerings 340, service offerings 345, and templates 350. Content offerings 340 generally include content that may be inserted into the document of understanding. For example, content offerings 340 may include, without limitation, formatted text such as assumptions of the service agreement, the terms agreed to, legal form language (e.g., a disclaimer), graphics (e.g., a company logo), and links (e.g., a hyperlink to a company's webpage). In one embodiment, content offerings 340 further contains multimedia content, such as audio content, video content, and animated content. Of course, these examples are for illustrative purposes only, and are without limitation. Furthermore, one of ordinary skill in the art will quickly understand that content offerings 340 may include combinations of these and other content types as well. For example, the content offerings 340 may include an interactive animation containing formatted text that, when accessed by a user, links to a particular webpage.

Additionally, the service offerings 345 may include potential services that may be offered as part of the service agreement. As an example, a particular business may potentially offer both web hosting and database services, which may be reflected in the corresponding service offerings 345 for the particular business. In constructing an initial document 250, the builder 125 may reference these potential service offerings 345 and present them to a user for selection (e.g., using a user interface). If the user then selects the web hosting service, the builder 125 may insert a corresponding service component 330 into the initial document, based on the user's selection.

The content creation component 245 may also use templates in constructing the final document 145. In the depicted example, the templates 350 contain notify templates 355 and table templates 360. The notify templates 355 generally relate to the presentation of any notifications associated with the document creation component 245. For instance, once a final document 145 is created, the document creation component 245 may submit the final document 145 to a customer for approval. As discussed above, in one embodiment, the document creation component 245 sends a reference to a single, centralized copy of the final document 145 to the customer for approval, rather than a separate instance of the final document 145. Upon approval of the document 145 by the customer, the document creation component 245 may generate a notification using a notify template 355 to notify the document administrators of the customer approval.

In one embodiment, the document creation component 245 may submit the final document 145 to the customer using electronic correspondence, such as email. In such an embodiment, a document administrator may specify a particular notify template 355 during the creation of the document, and once the final document 145 is complete, the document creation component 245 may generate an email to the customer using a specified notify template 355 and containing a reference to the final document 145. As a second example, once the customer either rejects or approves the final document 145, the document creation component 245 may generate a corresponding notification to the document administrator using a notify template 355.

The table templates 360 may be used for generating tables related to the final document 145. Generally, a table template 360 may contain formatting information for use in the creation of a table. Without limitation, such formatting information may include fonts, margins, borders, shading, and so on. Additionally, different tables in the final document 145 may be generated using different table templates 360. Furthermore, although the table templates 360 may be used for the creation of tables in the final document 145, the table templates 360 may also be used for other tables, such as a table included in a notification. For example, a notification sent to a customer upon completion of the final document may contain a table including information on the service agreement (e.g., a response data, contact information, etc.), and such a table may be generated using a particular table template 360.

Figure 4:
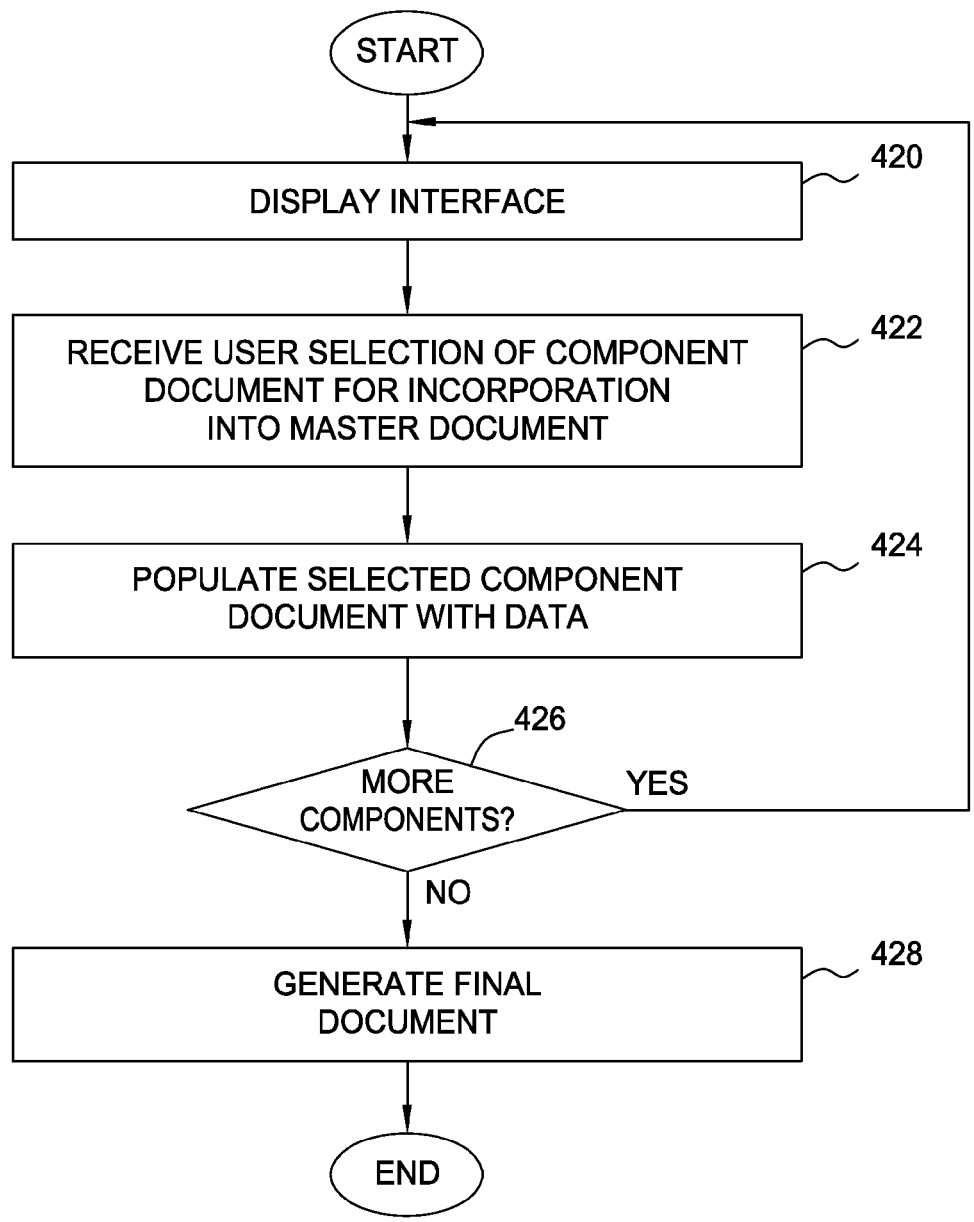
FIG. 4 is a flow diagram illustrating a method of creating a master document, according to one embodiment of the present invention.

FIG. 4 is a flow diagram illustrating a method of creating a master document, according to one embodiment of the present invention. As shown, the method 400 begins at step 420, where the document creation component 245 generates an interface for display to a user (e.g., using an I/O device 212, such as a monitor). The displayed interface may generally contain component documents 120 that may be inserted into an initial document 250. For example, the interface may contain a listing of available content offerings 340 and service offerings 345. The document creation component 245 then receives a user selection of a component document 120 for incorporation into the initial document 250 (step 422).

Once the document creation component 245 receives the user selection of a component document 120, the document creation component 245 populates the selected component document with data (step 424). As discussed above, the document creation component 245 may populate the component document with data retrieved from an external source (e.g., a database). Additionally, the document creation component 245 may further prompt the user for additional information, and may populate the component document 120 using the additional information specified by the user.

The document creation component 245 then determines whether the user wishes to add more components to the initial document 250 (step 426). In one embodiment, the document creation component 245 assumes that the user wishes to continue adding component documents to the initial document 250 until the user indicates otherwise (e.g., clicking a "Done" button). In another embodiment, the document creation component 245 may prompt the user to determine whether the user wishes to add another component document 120. If the user indicates he wishes to add another component document 120, the method begins again at step 420, where the document creation component 245 displays an interface containing component documents 120 that may be inserted into the initial document 250.

If, instead, the user indicates he does not wish to add any more component documents, the document creation component 245 generates the final document 145 based on the initial document 250 (step 428). Additionally, the final document 145 may be generated using one or more templates 350. For example, the document creation component 245 may determine the formatting for a particular table in the final document 145 using a table template 360 specified in the corresponding initial document 250. In one embodiment, the document creation component 245 may use a default table template 360 for creating tables in the final document 145, if no table template 360 is specified in the initial document 250. One the final document is generated, the method 400 ends.

Advantageously, the method 400 may create the document of understanding more efficiently than known solutions. For example, rather than recreating the existing component documents 120, the document creation component 245 creates the initial document 250 using a selection of existing component documents 120. The method 400 also improves the efficiency of the document creation by automatically formatting content in the final document 145 based on the templates 350. For example, a particular pricing structure in the final document 145 may include a table containing various pricing information. The appearance of such a table may be modified by adjusting formatting elements such as borders, cell shading, font style, font size, text alignment, and so on. However, rather than having the user manually adjust each of these elements for the table, the method 400 allows the user to simply specify a table template 360 for use in the creation of the table. As such, the method 400 more efficiently creates the final document 145. Furthermore, the component documents 120 may be automatically populated with information from an external source (e.g., a database). This may result in a substantial time savings for the user, as the user may avoid manually locating and retrieving the external information.

As an additional advantage, by automatically populating the components 120 with up-to-date information from an external source, the method 400 improves the quality of the document of understanding by ensuring that current information is used in the creation of the document. For example, the prices of particular services and hardware offered by a business may be frequently updated based on current market value. By automatically retrieving the most up-to-date prices when the final document is created 145, the method 400 ensures that the final document 145 contains accurate pricing information.

Figure 5:
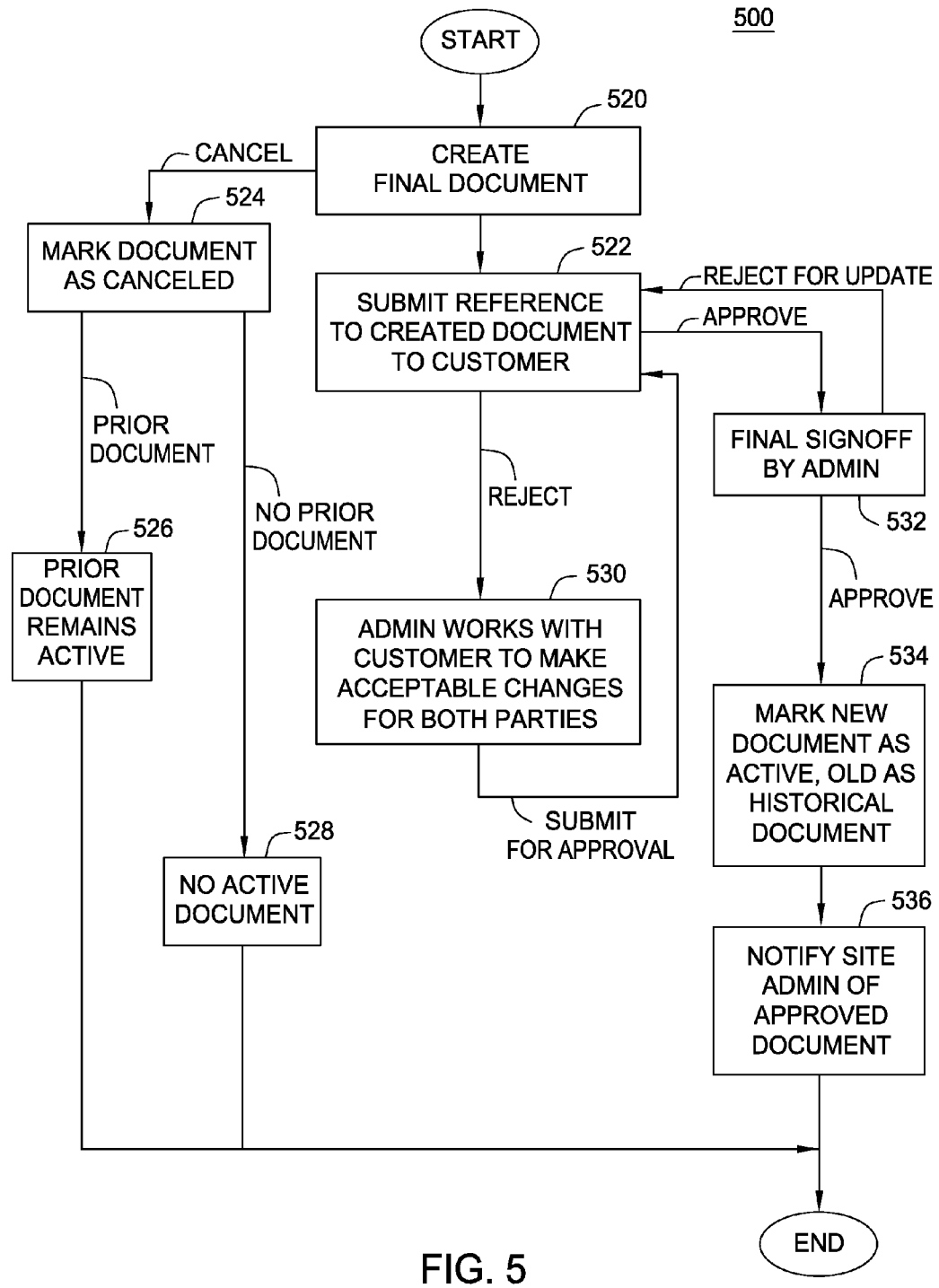
FIG. 5 is a flow diagram illustrating a method of approving a document, according to one embodiment of the present invention.

FIG. 5 is a flow diagram illustrating a method of approving a document, according to one embodiment of the present invention. For the purposes of this example, assume that the final document is created by a business, and that the final document represents a document of understanding between the business and a customer. As shown, the method 500 begins at step 520, where the document creation component 245 creates a final document 145. In one embodiment of the invention, the document creation component 245 creates the final document 145 by using the method 400, as discussed above. Once the final document 145 is created, the document creation component 245 submits a reference to the final document 145 to the customer for approval (step 522). That is, in the method 500, the document creation component 245 maintains a single, centralized copy of the final document 145, and rather than sending a separate instance of the final document 145 to the customer, the document creation component 245 sends a reference to the single instance of the final document 145.

Upon receiving the reference to the final document 145, the customer may take one of several courses of action. For instance, the customer may reject the final document 145, whereby a document administrator from the business works with the customer to make acceptable changes to the final document 145 (step 530). For example, a first draft of the final document 145 may specify that the business will provide computer hardware with 12 gigabytes of memory. However, after reviewing the pricing information in the final document 145, the customer may reject the first draft of the final document 145 and request only 8 gigabytes of memory (along with a corresponding reduced price). Once the document administrator for the business updates the final document 145, the method returns to step 522, where the document is again submitted to the customer for approval.

Additionally, upon receiving reference to the final document 145 from the business, the customer may approve of the final document 145. In one embodiment, upon receiving the approval from the customer, the document creation component 245 may generate a notification to a document administrator. For instance, such a notification may be generated based on a particular notify template 355. Once the customer approves of the final document 145, the document administrator is prompted for a final signoff on the final document 145 (step 532). If the administrator rejects the final document 145, the administrator may revise the final document 145. For example, when reviewing the final document 145 for a final approval, the document administrator may notice an oversight in the document, and accordingly reject the final document 145 to correct the oversight. The method then returns to step 522, where the document is again submitted to the customer for approval.

If instead the administrator approves the final document 145, the final document 145 is marked as an active document of understanding between the business and the customer (step 534). Additionally, any previously active document of understanding for the same service agreement is marked as an inactive historical document at this point. That is, because the final document 145 replaces the previously active document of understanding, the previously active document is marked as inactive. Once the final document is marked as active, the document creation component 245 notifies the document administrator accordingly (step 536). As discussed above, such a notification may be generated using a notify template 355. For instance, the document creation component 245 may contain settings that allow document administrator to configure default notify templates 355 for use in notifications the document creation component 245 sends. As an example, a document administrator may configure the document creation component 245 so that notifications sent when a customer rejects a document use a first template, and notifications sent when a customer accepts a document use a second, different template. Additionally, in such an embodiment, the settings may allow the document administrator to configure a specific notify template 355 for use with particular notifications the document creation component 245 sends.

On the other hand, upon receiving the reference to the final 145 document, the customer may decide to cancel the service agreement altogether. In this scenario, the document creation component 245 marks the final document as cancelled (step 524). If a prior document of understanding exists and is already active, the prior document of understanding remains active (step 526), and the method 500 ends. For example, the final document 145 in the method 500 may represent a revised version of an existing service agreement between the business and the customer and the final document 145, if approved, would replace the existing, active service agreement between the two. In such an example, upon cancelling the final document 145 (i.e., the revised version of the service agreement), the previous existing service agreement between the business and the customer would remain in effect. If instead no prior document of understanding exists, or if the existing prior document was not active, then no document will remain active between the business and the customer (step 528), and the method ends.

Document Renewal and Translation

As discussed above, documents of understanding generally specify the terms of an agreement between two parties, and often for a limited amount of time. For example, a document of understanding may be created to govern a service agreement between a business and a customer for a period of one year. After such time elapses, the document may be said to expire. In such an event, the parties may agree to renew the document of understanding for another amount of time (e.g., a year). During such a renewal, the parties may wish to modify certain terms of the document from one iteration to the next. As an example, the business may wish to modify the pricing schedule associated with the service agreement to account for an updated pricing model. However, currently such a modification is a manual process which consumes a substantial amount of both time and resources, and is often an error-prone process as well. Additionally, since a single business may maintain separate documents of understanding for each of many different customers, manually renewing each of these documents can be very costly and inefficient process.

Figure 6:
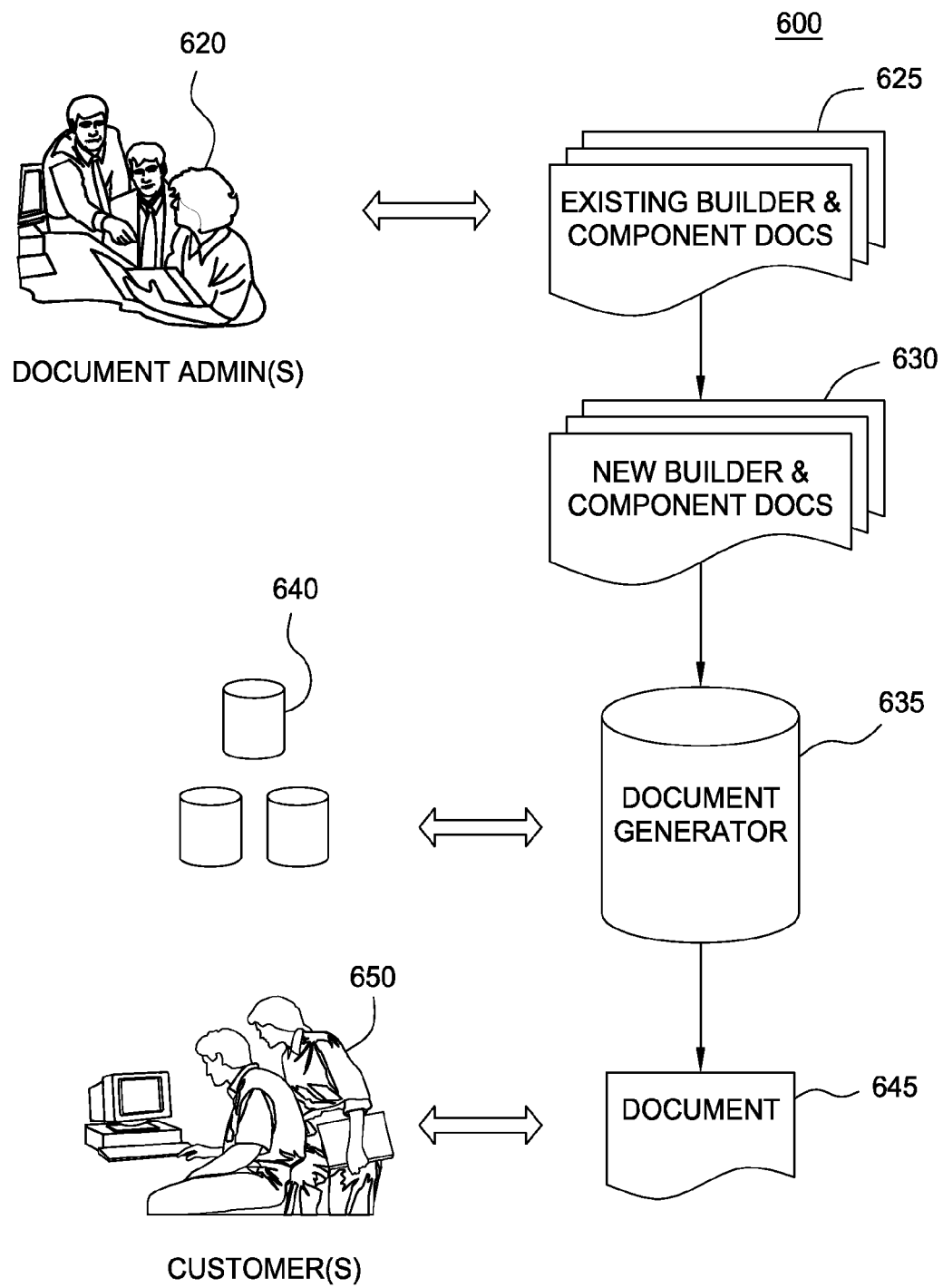
FIG. 6 is a diagram illustrating the renewal of an existing document, according to one embodiment of the present invention.

FIG. 6 is a diagram illustrating the renewal of an existing document, according to one embodiment of the present invention. For purposes of this example, assume that the existing document is a document of understanding related to an exemplary service agreement set to expire at some point in time, and that the existing document is being updated and renewed for a period of time. As shown, the method 600 begins with the document administrators 620 interacting with existing builder and component documents 625 that were used to create the existing document. For purposes of this example, assume that the existing builder was used to create an initial document using a number of component documents, and that the existing document of understanding was then generated from this initial document. Here, the document administrators 620 may designate which component documents they wish to update during the renewal process, and which component documents they wish to remain the same. For example, the existing document may contain a content offering 340, such as a legal disclaimer, that the document administrators 620 may not wish to change when renewing the document. As a second example, the existing document may contain a billing component 320 specifying a pricing structure that the document administrators 620 may wish to update in the revised document to reflect a new pricing model.

Furthermore, updates to the existing document do not necessarily require modifications to the existing component documents that make up the existing document. For instance, the document administrators 620 may wish to change the order of the existing component documents, but to maintain the content in the existing component documents. As another example, the document administrators 620 may wish the content of a particular table to remain the same, but may wish to alter the visual appearance of the table using a different table template 360. Of course, such examples are without limitation and for illustrative purposes only, and more generally the document administrators 620 may examine any content in the existing document in determining what content should be revised during the renewal process.

Once the document administrators 620 have selected which existing component documents they wish to update during the renewal process, the document administrators 620 then interact with a new builder and component documents 630 to select new content to incorporate into the updated document. Such new content may replace existing content in the existing document, or may be new content altogether. The new builder may create an updated initial document based on the selection. For example, if the document administrators 620 designate that a particular content offering 340 (e.g., a legal disclaimer) should be replaced in the updated document, the new builder may insert the replacement content offering 340 into the updated initial document in the place of the existing content offering. Additionally, the document administrators 620 may then select new component documents to incorporate into the updated initial document. For example, if the document administrators 620 wish to revise the pricing structure of the existing document during the renewal process, the document administrators 620 may select a new billing component 320 to incorporate into the updated initial document.

Once the updated initial document is created, the document generator 635 may interact with one or more other applications 640 (e.g., a database) in order to populate portions of the updated initial document. For example, the document generator 635 may retrieve updated pricing information from a pricing database 640, and may use the updated pricing information to populate fields in the billing component 320. In one embodiment of the present invention, the document administrators 620 may use the builder 630 to specify a particular source 640 to retrieve information from. For example, the document administrators 620 may specify that the billing component in the updated initial document should be populated using a particular database table related to pricing information. Additionally, such a data source 640 may be, but is not necessarily, a different data source than was used in populating the existing document being renewed. For example, while the existing document may refer to a database table containing pricing data for the year 2009, the updated initial document may refer to a database table containing pricing data for the year 2010.

Once all the components (both existing component 625 and new components 630) have been added to the updated initial document and once any empty fields in the initial document are populated, the initial document is sent to the document generator 635 to create the updated document 645. As referred to here, the updated document generally refers to the revised document of understanding generated according to embodiments of the invention. That is, although a first draft of the document of understanding has been created, such a draft may not be marked as active (i.e., will not take effect) until both parties to the document have agreed to its terms. In one embodiment, the document creation component 245 may also receive a language selection from the user, and may generate the updated document in the selected language. In such an embodiment, the document creation component 245 may be further configured to receive multiple language selections, and generate a separate instance of the updated document in each of the selected languages.

Once the updated document is generated, the updated document 645 may then be sent to the customers 650 for approval. In one embodiment, rather than sending a separate instance of the document of understanding to the customers 650 for approval, embodiments may send a reference to a single, centralized copy of the document. Upon receiving the updated document 645 (or a reference to the updated document), if the customers 650 wish to modify the updated document 645, the customers 650 may reject the updated document 645 and return the document to the document administrators 620 for revisions. The document administrators 620 may use the builder 630 to revise the components in the updated initial document, based on the revisions specified by the customer 650. A revised document may then be generated using the document generator 635, and the revised document may be submitted to the customers 650 for approval. Upon approval of the updated document 645 (or the revised document), the updated document 645 is marked as active and takes effect as the document of understanding for the exemplary service agreement. In one embodiment, the updated document 645 may be marked as approved, but may not be marked as active (i.e., will not take effect) until the existing document expires.

Advantageously, by doing this, embodiments of the invention may more efficiently renew and revise a document of understanding for a particular project by using both existing component documents and data 625 and new component documents 630. For example, an existing solution for renewing a billing section of a new document of understanding is to manually locate the billing section in the document, research updated pricing data, and manually revise the billing section with the updated pricing data. Additionally, such manual revisions must be done for each separate document of understanding, and often times must be done in regular intervals (e.g., yearly). In contrast, embodiments of the invention may improve the efficiency of the renewal process by revising an existing billing component in the existing document using a new component document 630, and then automatically populating the revised billing component with pricing data retrieved from a database 640. By doing this, embodiments of the invention may more efficiently renew the document of understanding, and enable the efficient mass renewal of a number of existing documents. Furthermore, although the time and resource savings for renewing a single document are significant, the savings for renewing a large number of documents are substantial.

Figure 7:
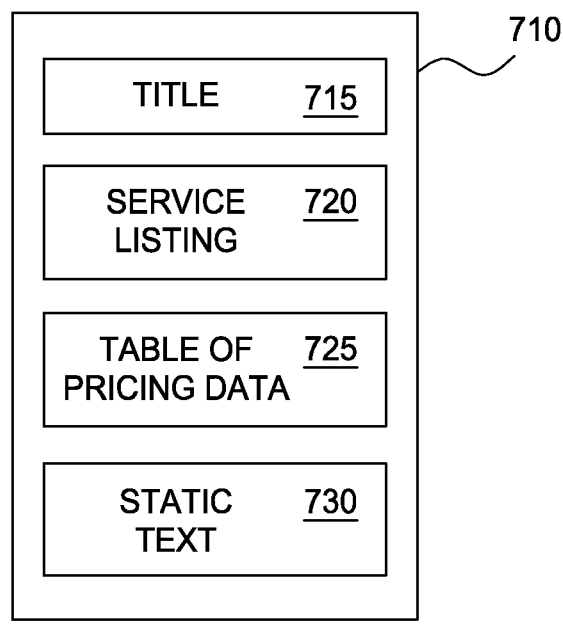
FIG. 7 is a block diagram of an exemplary document, according to one embodiment of the present invention.

FIG. 7 is a block diagram of an exemplary document, according to one embodiment of the present invention. As discussed above, an existing document may generally be modified during the renewal process in any way according to the functions described herein. Such modifications may include, but are not limited to, adding content to the existing document, removing content, rearranging content, and altering content. For the purposes of this example, assume the depicted document is generated by the document creation component 245, using a plurality of component documents 120. As shown, the document 710 contains a title 715, a service listing 720, a table of pricing data 725 and a section of static text 730. In renewing the document 710, any or all of the components contained in the document may be updated or revised. For example, if the title 715 of the existing document is "Exemplary Service Agreement: 2009-2010", the title 715 may be revised to read "Exemplary Service Agreement: 2010-2011" as part of the renewal process.

The service listing 720 contains a list of services included as part of the service agreement, each of which may be based on a separate services component 330, and which may be revised during the renewal process. For example, the customer may wish to add an additional service to the service listing 720. Accordingly, as part of the renewal process, the document creation component 245 may populated a new services component 330 and add the new component 330 to the updated document. As a second example, the business may wish to modify the name or content of a particular service, and so the document creation component 245 may modify the associated service component 330 accordingly. Additionally, the ordering of elements within a component may be modified as part of the renewal process. For instance, if the services within the existing service listing 720 are ordered in alphabetical order, the document creation component 245 may modify the order to sort the services in ascending order by price as part of the renewal process.

Additionally, the business may wish to modify the table of pricing 725 as part of the renewal process. As discussed above, one modification may be to revise the data in the table 725 to reflect an updated pricing model. Such modifications may include different prices (e.g., increasing to $110 per month, from $100 per month) or may include different pricing models (e.g., fixed fee versus hourly charges). Additionally, the appearance of such a table 725 may be updated as part of the renewal process using, for example, a table template 360. That is, although the content of the table may remain unchanged, the table may be generated using a different table template 360, in order to change the visual characteristics of the table. The static text 730 may be generated using a content offering 340. For example, the static text 730 may refer to a legal disclaimer inserted at the bottom of the document 710. During the renewal process, the static text 730 may be modified by, for example, using an updated content offering 340. Of course, these examples are for illustrative purposes only and are without limitation, and one of ordinary skill in the art will quickly recognize that existing documents may contain any number, type, and arrangement of components, and that these components may be modified in any way as described herein as part of the renewal process.

Figure 8:
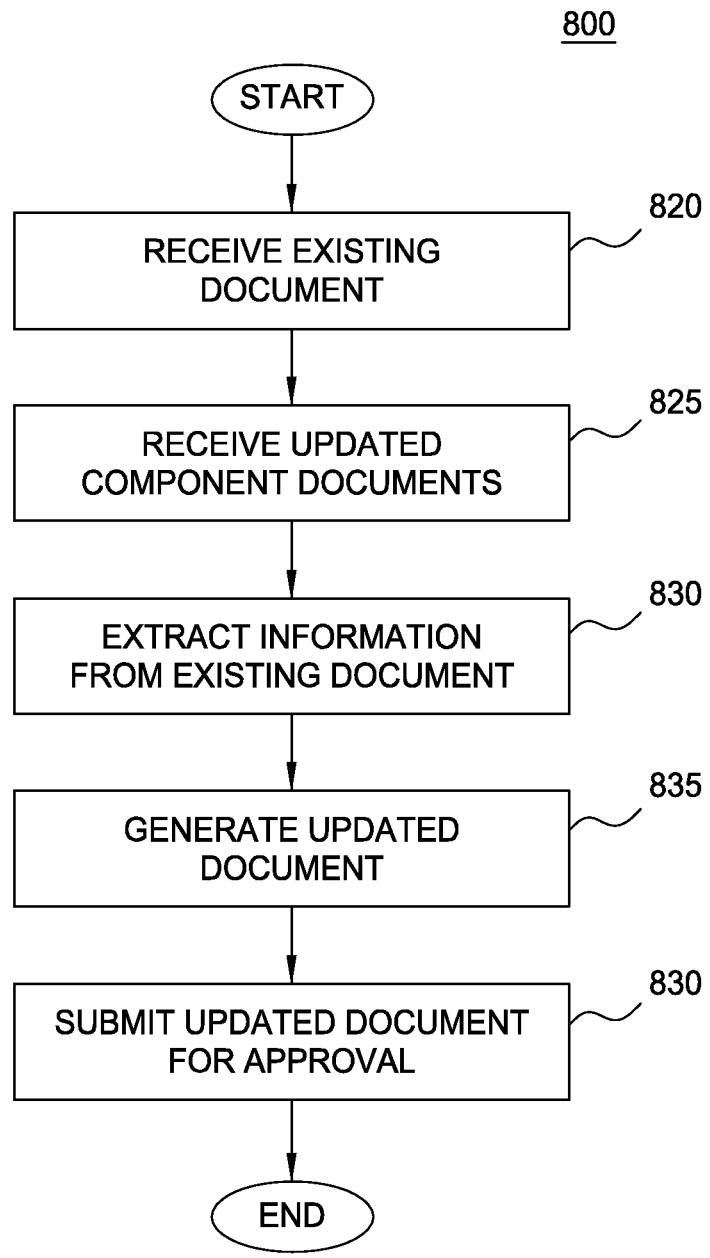
FIG. 8 is a flow diagram illustrating a method of renewing a document, according to one embodiment of the present invention.

FIG. 8 is a flow diagram illustrating a method of renewing a document, according to one embodiment of the present invention. As shown, the method 800 begins at step 820, where the document creation component 245 receives an existing document of understanding to be renewed. Upon receiving the existing document, the document creation component 245 retrieves updated component documents for use in revising the existing document (step 825). In one embodiment, an interface is provided that displays a plurality of updated component documents. A user (e.g., a document administrator) may then select updated component documents from the interface to include in an updated document. Additionally, such an interface may also enable the user to specify whether a selected component document should replace an existing component in the received existing document, or whether the selected component document should be added as a new addition to the updated document. For example, the user may select an updated billing component 320 from the interface and may specify that the updated billing component 320 should replace an existing billing component in the received existing document. By doing this, embodiments of the invention enable the user to efficiently revise the pricing plan of a service agreement during the renewal of the document. As a second example, a customer may request additional services as part of the service agreement. In such a scenario, the user may select one or more additional services components 330 from the interface, and the document creation component 245 may incorporate these additional components into the updated document as part of the renewal process.

The document creation component 245 then extracts information from the existing document (step 830). For example, if the user indicates that a particular header 335 in the existing document should be incorporated into the updated document, the document creation component 245 may extract the contents of the header 335 from the existing document. In one embodiment, the document creation component 245 may extract information from the initial document used to create the existing document. Continuing the above example, the document creation component 245 may extract the particular header 335 from the initial document used to create the existing document, and may insert the header component 335 into the updated initial document. Additionally, as discussed above, the extracted content may be modified as well. Thus, for example, if the header 335 in the existing document contains the content "Exemplary Service Agreement: 2009-2010," the document creation component 245 may extract this content during the renewal process and may modify the content to be "Exemplary Service Agreement: 2010-2011."

Once the content is extracted from the existing document, the document creation component 245 generates an updated document (step 835). The updated document may be generated based on the updated component documents and the information extracted from the existing document. That is, the document creation component 245 may incorporate existing content from the existing document as well as new component documents into the updated document. Upon generating the updated document, the document creation component 245 then submits the updated document for approval (step 830) and the method ends.

Advantageously, the method 800 enables the efficient renewal of existing documents of understanding and the generation of updated documents. That is, by allowing users to select existing component documents and updated component documents (e.g., using an interface) for incorporation in the updated document, embodiments enable users to easily and efficiently revise even complex documents of understanding. Furthermore, because embodiments generate the updated document using a plurality of component documents, these revisions may be replicated to any number of document renewals. Additionally, embodiments improve the accuracy of information contained in the updated document, since such information may be automatically retrieved from a data source (e.g., a database) and inserted into the document at the time of renewal. By doing this, embodiments help to ensure that the information contained in the updated document is both current and accurate. While these cost and resource savings are significant in the context of renewing a single document of understanding, these savings may be quite substantial in the context of a mass renewal of a large number of documents.

Figure 9:
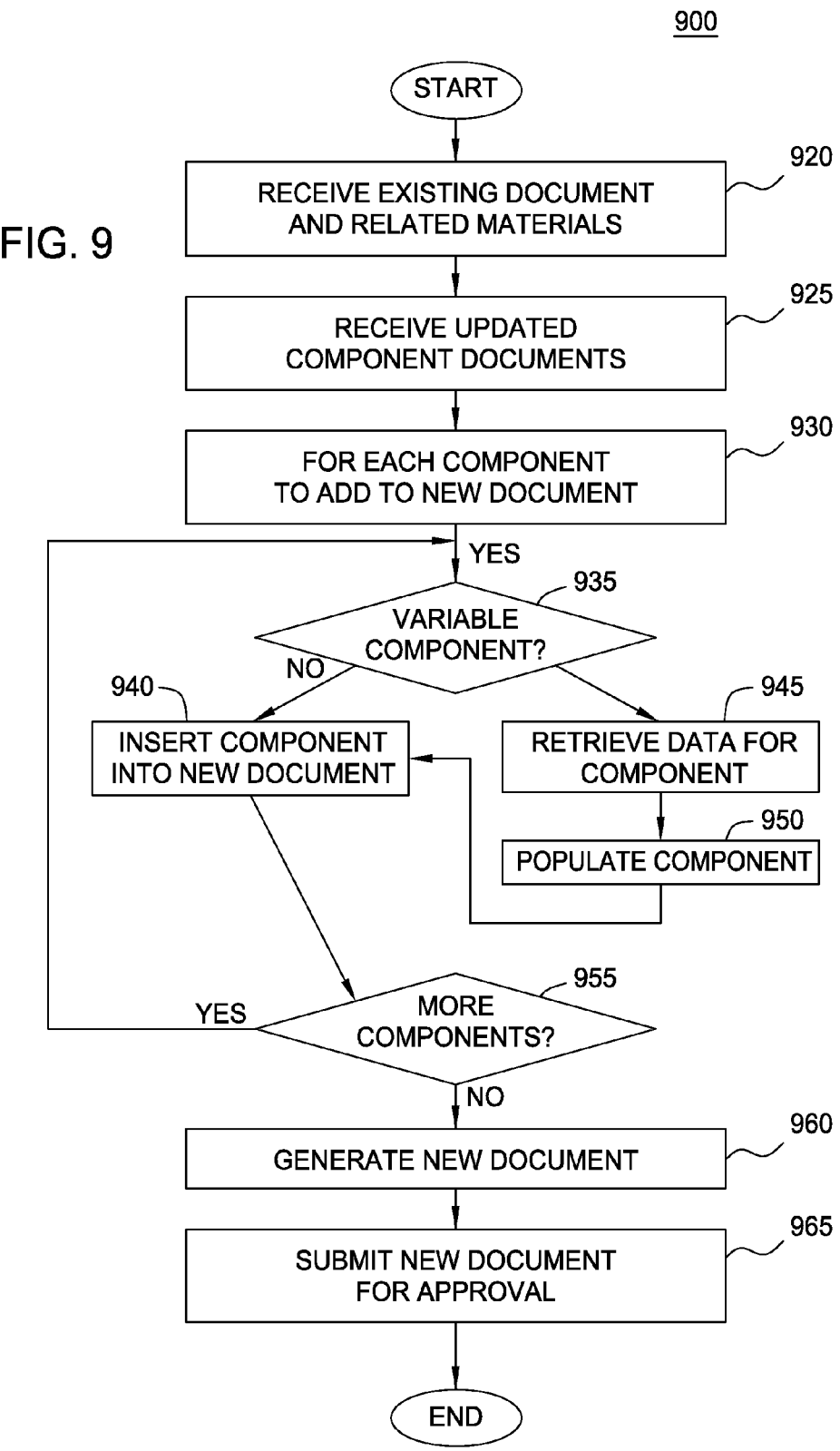
FIG. 9 is a flow diagram illustrating a method of renewing a document, according to one embodiment of the present invention.

FIG. 9 is a flow diagram illustrating a method of renewing a document, according to one embodiment of the present invention. As shown, the method 900 begins at step 920, where the document creation component 245 receives an existing document of understanding to be renewed. Upon receiving the existing document, the document creation component 245 retrieves updated component documents for use in revising the existing document (step 925). As discussed above, one embodiment provides an interface that displays a plurality of updated component documents. A user (e.g., a document administrator) may then select updated component documents from the interface to include in an updated document. Additionally, such an interface may also enable the user to specify whether a selected component document should replace an existing component in the received existing document, or whether the selected component document should be added to the updated document.

The method 900 then begins a loop for each component the user has specified should be added to the updated document (step 930), where the document creation component 245 first determines whether the component is a variable component (step 935). Generally, a variable component in this context refers to any component which may be populated with data before it is incorporated into the updated document. For example, an exemplary variable component may be a billing component 320 which may be populated with pricing data. Such a variable component may be a component in the existing document that the user wishes to modify, or may be an updated component document that the user wishes to add as part of the renewal process.

If the component is determined to be a variable component, the document creation component 245 retrieves data associated with the component (step 945). Generally, such data may be retrieved from any data source. As an example, the document creation component 245 may retrieve pricing data related to a particular billing component 320 from an external database. The document creation component 245 may also retrieve data from the existing document of understanding. For instance, the user may specify that all the services included in the existing document should remain in effect, but that additional services should also be added to the updated document. In such an example, the document creation component 245 may retrieve data from a services component 330 associated with the existing document. Upon retrieving the data, the document creation component 245 then populates the component with the retrieved data (step 950). Continuing the above example, once the document creation component 245 retrieves the data from the services component 330 associated with the existing document, the document creation component 245 may then incorporate both the retrieved data and new services data in a services component 330 in the updated document.

Once the component is populated, or if the component is determined not to be a variable component, the document creation component 245 inserts the component into the updated document. As discussed above, a non-variable component may be any component with a fixed value. For example, a content offering 340 such as a legal disclaimer may be considered a non-variable component, as the content is fixed and need not be populated with any values. Once the component is inserted into the updated document, the document creation component 245 determines whether there are more components the user wishes to add to the document (step 955). If the document creation component determines there are more components to add, the loop returns to step 935, where the document creation component 245 determines whether the next component is a variable component. If, instead, the document creation component 245 determines there are no more components to add, the document creation component 245 generates the updated document (step 960). The document creation component 245 then submits the generated document for approval (step 965), and the method 900 ends.

Figure 10:
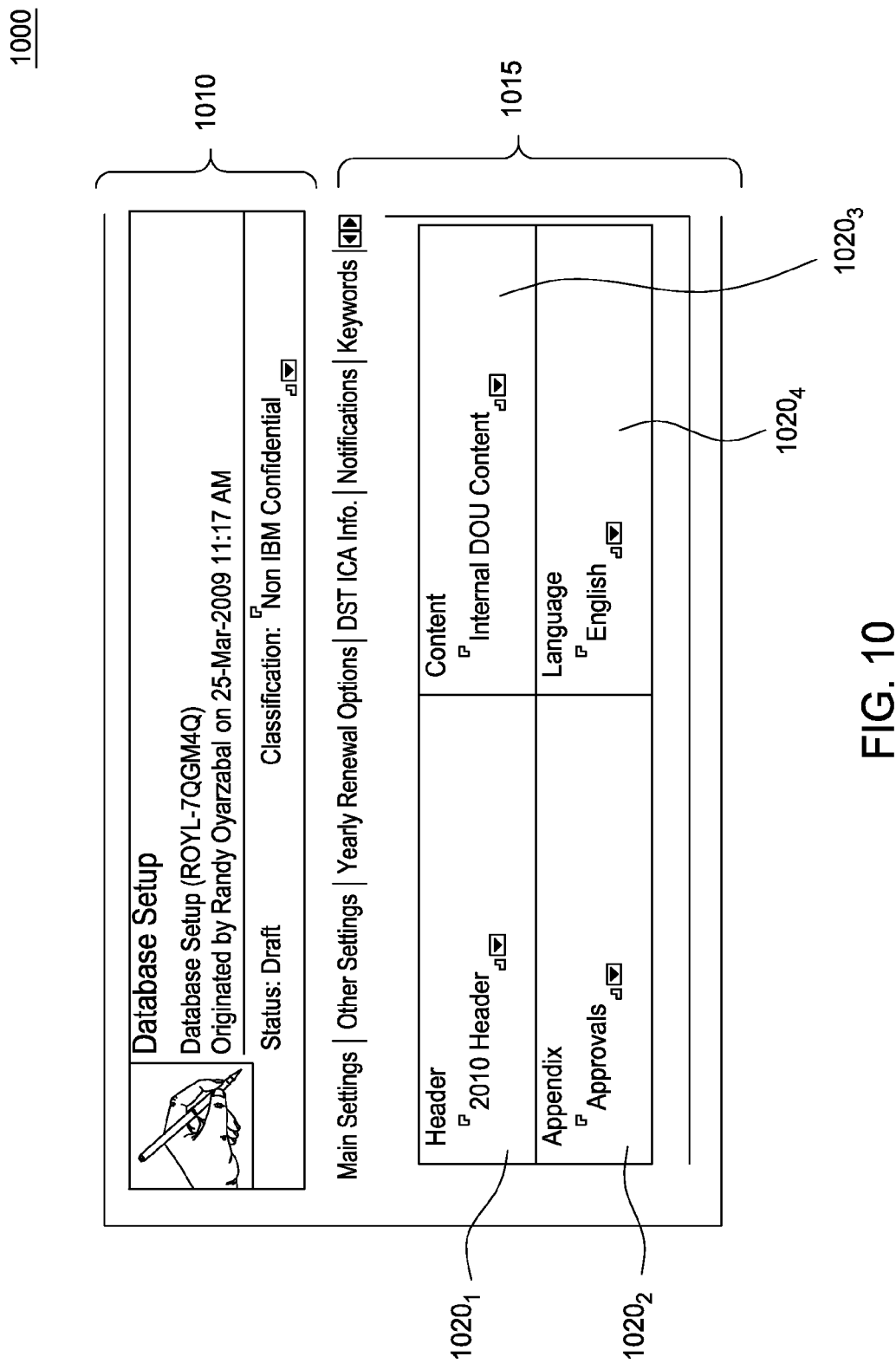
FIG. 10 is a screenshot illustrating a document renewal page of a document creation component, according to one embodiment of the present invention.

FIG. 10 is a screenshot illustrating a document renewal page of a document creation component, according to one embodiment of the present invention. As shown, the screenshot 1000 includes a header portion, which generally contains metadata about the document renewal. For example, in the depicted embodiment, the header portion 1010 contains information such as the name of the renewal page (i.e., "Database Setup"), the creator of the document (i.e., "Randy Oyarzabal"), and a date of creation for the document (i.e., "25 Mar. 2009 11:17 AM"). Of course, the depicted embodiment is for illustrative purposes only, and more generally any data or metadata associated a template may be included in a header portion 1010.

The screenshot also contains a content portion 1015, which includes a selection of component documents 1020 for inclusion in the updated document. For example, the component document 1010$_1$ indicates that the updated document should contain the header component 335 named "2010 Header." As discussed above, the document creation component 245 may retrieve data from existing components in populating components in the updated document. Additionally, if the user wishes to change a component as part of the renewal process, the user may do so using the document renewal page. For example, assume the existing header for 2009 included the language "$Project$: 2009", where $Project$ represents the name of the project associated with the existing document, and that the depicted service agreement is for the project named "Exemplary Service Agreement." As such, the existing document, as generated, may contain the header "Exemplary Service Agreement: 2009". If the user then selects, as part of the renewal process using the document renewal page 1000, the header named "2010 Header" which includes the language "$Project$: 2010", the document creation component 245 may retrieve the name of the project from the existing document, and thus the updated document, when generated, may contain the header "Exemplary Service Agreement: 2010".

Additionally, the document creation component 245 may generate the updated document in one or more different languages. For instance, in the depicted example, the language 1020$_4$ is specified as "English." In one embodiment, multiple languages may be specified for the updated document, and the document creation component 245 may generate a separate instance of the updated document in each of the specified languages. The language $1020_4$ option of the document renewal page 1000 may also be used to convert an existing document in a first language into an updated document in a second language. For example, assuming the existing document is generated in English and the language option $1020_4$ is changed to Spanish, the document creation component 245 may extract content from the existing document, translate the extracted content from English to Spanish, and generate the updated document in Spanish using the translated content.

Advantageously, the document renewal page 1000 provides a utility through which even less sophisticated users may efficiently renew a document of understanding. By providing an interface which allows users to intuitively select which component documents should be maintained in the existing document and which component documents should be modified or added to the existing document, embodiments of the invention improve the efficiency of the document renewal process. Additionally, embodiments enable the changes made during the renewal of a first existing document to be easily and efficiently reused in the renewal of other existing documents, thus enabling the mass-renewal of existing documents of understanding. Furthermore, because embodiments enable documents to be generated in a number of different languages, embodiments may generate a wider range of documents of understanding, and may also accommodate situations where a single document needs to be generated in multiple different languages.

Figure 11:
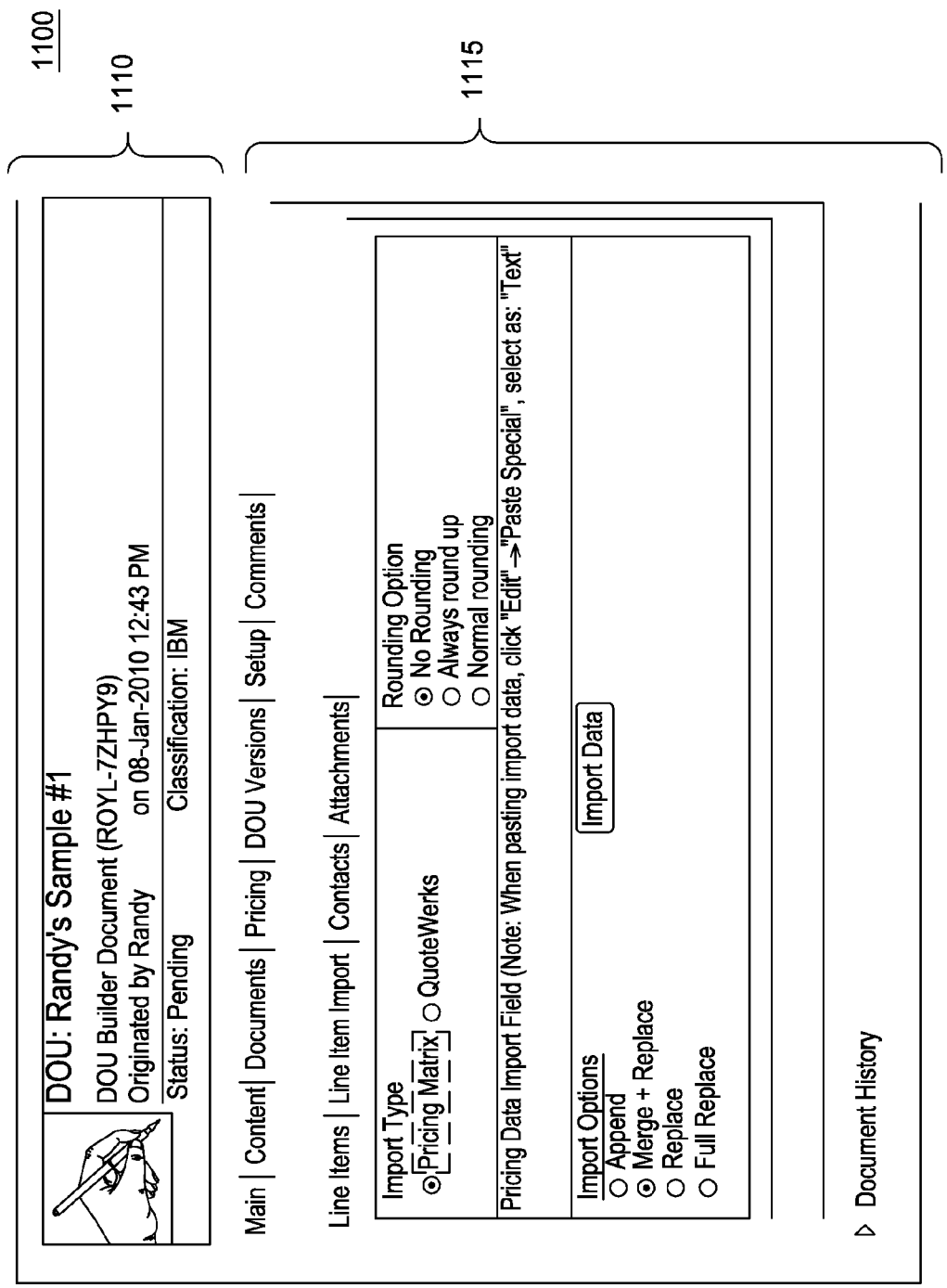
FIG. 11 is a screenshot of an exemplary data import page of a document creation component, according to one embodiment of the present invention.

FIG. 11 is a screenshot of an exemplary data import page of a document creation component, according to one embodiment of the present invention. Generally, the data import page is used by the document creation component 245 to import data from an external data source. For example, in one embodiment, the document creation component 245 may import data (e.g., up-to-date pricing data) from an external database. As shown, the screenshot 1100 includes a header portion 1110 and an import configuration portion 1115. As discussed above, the header portion 1110 generally contains metadata describing the associated document of understanding.

The import configuration portion 1115 of the screenshot 1100 includes a number of different settings for importing the data. For instance, the import configuration portion 1115 includes an import type, rounding options for rounding the imported data, and an import conflict option (i.e., "Append," "Merge+Replace," "Replace," "Full Replace"). For example, in one embodiment, the document creation component 245 may be configured to import data from two or more external sources. In such a scenario, the document administrator may specify an action to be taken in the event that particular imported data records conflict with one another. For example, the document creation component 245 may be configured to always give preference to a particular external data source, and to always replace conflicting existing values when importing from the particular external data source (e.g., using the "Replace" option). Of course, the depicted data import page is for illustrative purposes only, and one of ordinary skill in the art will recognize that any interface capable of performing the functions described herein may be used.

In one embodiment, the data import page 1100 may be used as part of the renewal process to populate one or more component documents. For example, the data import page 1100 may be used in conjunction with a table template to generate and populate a table of data in the updated document. In such a scenario, the table template may specify a formatting style for the generated table, while the import page may specify a data source (e.g., a database) from which data should be imported. Additionally, during the renewal process, the data import page 1100 may import data from a different data source than was used in the creation of the existing document. As an example, a particular billing component in the existing document may have been populated using a database table containing pricing data for the year 2009. When the existing document is renewed, a user may use the data import page 1100 to indicate that the document creation component 245 should import updated pricing data from a different database table containing pricing data for the year 2010. Advantageously, by doing so, embodiments of the invention improve the efficiency of the document renewal process by automatically retrieving data and using such data to populate portions of the updated document. Furthermore, by retrieving updated data at the time of the renewal, embodiments help to ensure that the data contained in the updated document of understanding is accurate and up-to-date.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
interactively generating, using a provided graphical user interface (GUI) and based on a plurality of input data received through the GUI, on a non-transitory computer-readable medium, data representing a document that defines an agreement between at least two entities, based on two or more instances of component documents from a plurality of instances of component documents, wherein at least a portion of content within the data representing the document is inserted from a first data source specified by a first instance of component document of the two or more instances of component documents, and wherein the at least a portion of the content within the data representing the document is formatted according to template data specified by a second instance of a component document of the two or more instances of component documents;

receiving a request to renew the document, once attribute data describing the document is processed to determine that the document has expired;

receiving a selection, within a second provided GUI, of a plurality of instances of updated component documents from the plurality of instances of component documents, wherein the plurality of updated instances of component documents include an updated first instance of a component document specifying a second data source that is distinct from the first data source;

automatically generating data, on the non-transitory computer-readable medium, representing an updated document, by a first entity of the at least two entities and by operation of one or more computer processors, by populating a first portion of the data representing the updated document using data elements extracted from the data representing the document and further by populating a second portion of the data representing the updated document using data extracted from the second data source specified by the updated first instance of the component document, wherein the data representing the updated document is formatted differently than the data representing the document, based on template data specified by one of the one or more updated instances of component documents;

transmitting, over a data communications network, one or more data messages, specifying the data representing the updated document to a second entity of the at least two entities for approval;

upon receiving, over the data communications network, a second one or more data messages indicating an approval of the data representing the updated document by the second entity and upon determining that the document is currently an active document, marking the data representing the updated document as approved without activating the updated document, wherein the active document represents an effective legal agreement between the at least two entities, and wherein once active the updated document replaces the document as the effective legal agreement between the at least two entities; and upon detection that the document has expired, automatically activating the updated document as the effective legal agreement between the at least two entities.

2. The computer-implemented method of claim 1, further comprising:

upon receiving a third one or more data messages indicating a rejection of the data representing the updated document:

modifying at least one of the plurality of instances of updated component documents in the received selection; and generate a second version of the data representing the updated document, based on the plurality of instances of updated component documents.

3. The computer-implemented method of claim 2, further comprising:

submitting the second version of the data representing the updated document for approval; and upon approval of the second version of the updated document, marking the second version of the updated document as active, to indicate a revised agreement defined by the second version of the updated document is in effect.

4. The computer-implemented method of claim 2, wherein the plurality of instances of updated component documents includes at least one build component and one utility component, and wherein receiving the selection of the plurality of instances of updated component documents further comprises:

receiving a first selection of a build component data object from the plurality of instances of updated component documents, wherein the build component data object defines a portion of the document; and receiving a second selection of a utility component data object from the plurality of instances of updated component documents, wherein the utility component data object defines a structure of at least a portion of the document, and wherein automatically generating the data representing the updated document is further based on the first selection of the build component data object and the second selection of the utility component data object.

5. The computer-implemented method of claim 1, further comprising:

generating one or more data packets specifying a notification, based on an occurrence at least one of (i) approval of the update document, (ii) rejection of the updated document, (iii) cancellation of the updated document, (iv) submitting the updated document for approval, and (v) marking the updated document as active.

6. The computer-implemented method of claim 1, further comprising:

upon receipt of two or more languages selected by a user, generating data representing a respective translated updated document for each of the two or more selected languages.

7. The computer-implemented method of claim 1, wherein the one or more data messages specifying the data representing the updated document include a link to a single, centralized copy of the data representing the updated document, thereby preventing creation of multiple, inconsistent versions of the data representing the updated document.

* * * * *